(12) United States Patent
Coven

(10) Patent No.: US 6,319,546 B1
(45) Date of Patent: Nov. 20, 2001

(54) HAND SPREADABLE SURFACE COATING FOR BATHTUBS AND THE LIKE AND METHOD FOR ITS APPLICATION

(76) Inventor: Steven R. Coven, 1328 Linden Ave., Highland Park, IL (US) 60035

( * ) Notice: Subject to any disclaimer, the term of this patent is extended or adjusted under 35 U.S.C. 154(b) by 0 days.

(21) Appl. No.: 09/373,149

(22) Filed: Aug. 12, 1999

(51) Int. Cl.$^7$ .............................. B32B 35/00; B05D 3/12
(52) U.S. Cl. .................. 427/140; 427/230; 427/290; 427/307; 427/388.1; 427/388.2; 427/429
(58) Field of Search .................. 427/333, 385.5, 427/388.1, 388.2, 307, 290, 236, 230, 429, 140

(56) References Cited

U.S. PATENT DOCUMENTS

| | | |
|---|---|---|
| 3,614,793 | 10/1971 | Niemiroff . |
| 4,013,614 | 3/1977 | Self . |
| 4,043,853 | 8/1977 | Saladino . |
| 4,105,734 | 8/1978 | Nakagawa . |
| 4,158,585 | 6/1979 | Wright . |
| 4,322,460 | 3/1982 | Howe et al. . |
| 4,363,145 | 12/1982 | Kawesch . |
| 4,387,194 * | 6/1983 | Ottaviani et al. .................. 524/454 |
| 4,511,621 | 4/1985 | Thomas et al. . |
| 4,518,641 | 5/1985 | Shimmin et al. . |
| 4,837,278 * | 6/1989 | Cameron et al. .................. 525/162 |
| 4,931,330 | 6/1990 | Stier et al. . |
| 5,387,290 * | 2/1995 | Kolinsky ................................ 134/32 |
| 5,560,092 | 10/1996 | Roiger . |
| 5,698,330 * | 12/1997 | Bederke et al. .................. 428/423.1 |
| 5,776,605 | 7/1998 | May . |
| 5,798,409 * | 8/1998 | Ho ...................................... 524/506 |
| 5,902,444 | 5/1999 | Falkner et al. . |
| 5,908,875 | 6/1999 | Smith . |
| 5,998,539 * | 12/1999 | Morishima et al. ................. 524/591 |
| 6,020,028 * | 2/2000 | Kinneberg ............................ 427/316 |

* cited by examiner

Primary Examiner—Shrive P. Beck
Assistant Examiner—Jennifer Calcagni
(74) Attorney, Agent, or Firm—Welsh & Katz, Ltd.

(57) ABSTRACT

A hand spreadable urethane surface coating product for covering and filling imperfections in an existing surface of a fixture designed for washing includes a first non-aqueous liquid composition of at least on aliphatic urethane resin prepolymer and a second liquid composition of a cross-linking agent for the prepolymer, which when mixed and poured onto a clean and dry surface of a fixture, and gently hand-applied with a cloth to the surface, forms a glossy, durable surface resembling the original surface when new.

13 Claims, 1 Drawing Sheet

HAND SPREADABLE SURFACE COATING FOR BATHTUBS AND THE LIKE AND METHOD FOR ITS APPLICATION

BACKGROUND OF THE INVENTION

1. Field of the Invention

The invention relates to the restoration of surfaces of washing fixtures, such as bathtubs, shower floors and walls, and the like, and more particularly, to an acrylic urethane coating composition and to methods for applying the coating composition to surfaces which contain imperfections to fill and cover imperfections in the surface. 2. Description of Related Art After a bathtub basin, shower enclosure, or other fixture designed for washing, such as bathing, has been installed and used for some period of time, scratches and cracks and other imperfections often develop on the inside surfaces, particularly if objects are dropped on the surface. Most frequently, the entire fixture is replaced, or a liner provided for the fixture as in U.S. Pat. No. 5,776,605, or the fixture removed and treated in another location and then reinstalled, in order to maintain fixtures that are aesthetically pleasing. If the fixture surface is to be restored, the restoration usually involves an expensive procedure involving specialized equipment, such as spraying, molding or vacuum equipment. Attempts have been made to fill only the crack or scratch without covering or restoring the entire inside surface of the fixture. Most commonly these attempts result in uneven surfaces which are unsightly, and where epoxies are used as a bonding to the existing surface, the bonded material is often brittle and tends to crack.

The present invention provides a hand-spreadable product and a method of its application for restoring the surface of a bathtub to provide an even, smooth surface without the need for application equipment.

SUMMARY OF THE INVENTION

An object of the present invention is to provide a composition and hand-applied method for restoring a surface of a fixture designed for washing.

Another object of the present invention is the provision of a coating composition which can be applied to a surface having imperfections, such as scratches and/or cracks, which after application provides an aesthetically pleasing, durable, substantially smooth and even finish with the imperfections filled and substantially indistinguishable from the remainder of the coated finish.

Another object of this invention is to provide a hand-spreadable composition for restoring the surface of bathtubs, showering facilities, and the like.

Still another object of the present invention is to provide a method of covering an existing surface having surface imperfections, such as scratches and/or cracks, with a resulting finish which is aesthetically pleasing, durable and substantially smooth and even, without the use of spraying, molding, vacuum or curing equipment.

These and other objects, advantages and novel features of the invention will become apparent from the following description in conjunction with the accompanying drawing.

In accordance with the present invention a hand-spreadable urethane surface coating product is provided for filling imperfections in an existing surface of a fixture designed for washing, e.g., a bathtub, a shower stall, and the like. The product comprises two non-aqueous liquid compositions which are to be mixed to form the coating composition. The first non-aqueous composition comprises at least one aliphatic acrylic urethane resin prepolymer, and the second non-aqueous composition comprises a cross-linking agent for the urethane resin prepolymer. Following mixing, and applying the mixed compositions to the surface, and permitting the coating product to dry for a period of several hours, the now-coated, restored surface is substantially smooth and even, with the scratches and/or cracks in the pre-existing surface being filled, and the restored surface being aesthetically pleasing.

Also in accordance with the present invention, a method is provided for covering an existing surface having imperfections therein, such as scratches and/or cracks, which fills such imperfections and provides a substantially smooth surface thereon which is aesthetically pleasing. The method, which does not utilize any equipment, other than cleaning materials and a lintfree cloth, comprises cleaning the existing surface and removing any loose materials thereon; allowing the existing surface following cleaning to dry; preparing a flowable and spreadable surface coating by combining a first non-aqueous composition of at least one aliphatic acrylic resin and a second non-aqueous liquid composition of a crosslinking catalyst for the resin; mixing the mixture; applying the mixture to the surface to be covered; permitting the covered surface to stand without use until coating is dry and hard. The resulting coating is substantially smooth, even and has a like-new gloss and appearance. The restored surface is substantially stain resistant and durable, extending the usable life of the fixture for many years.

DETAILED DESCRIPTION

Figure 1:
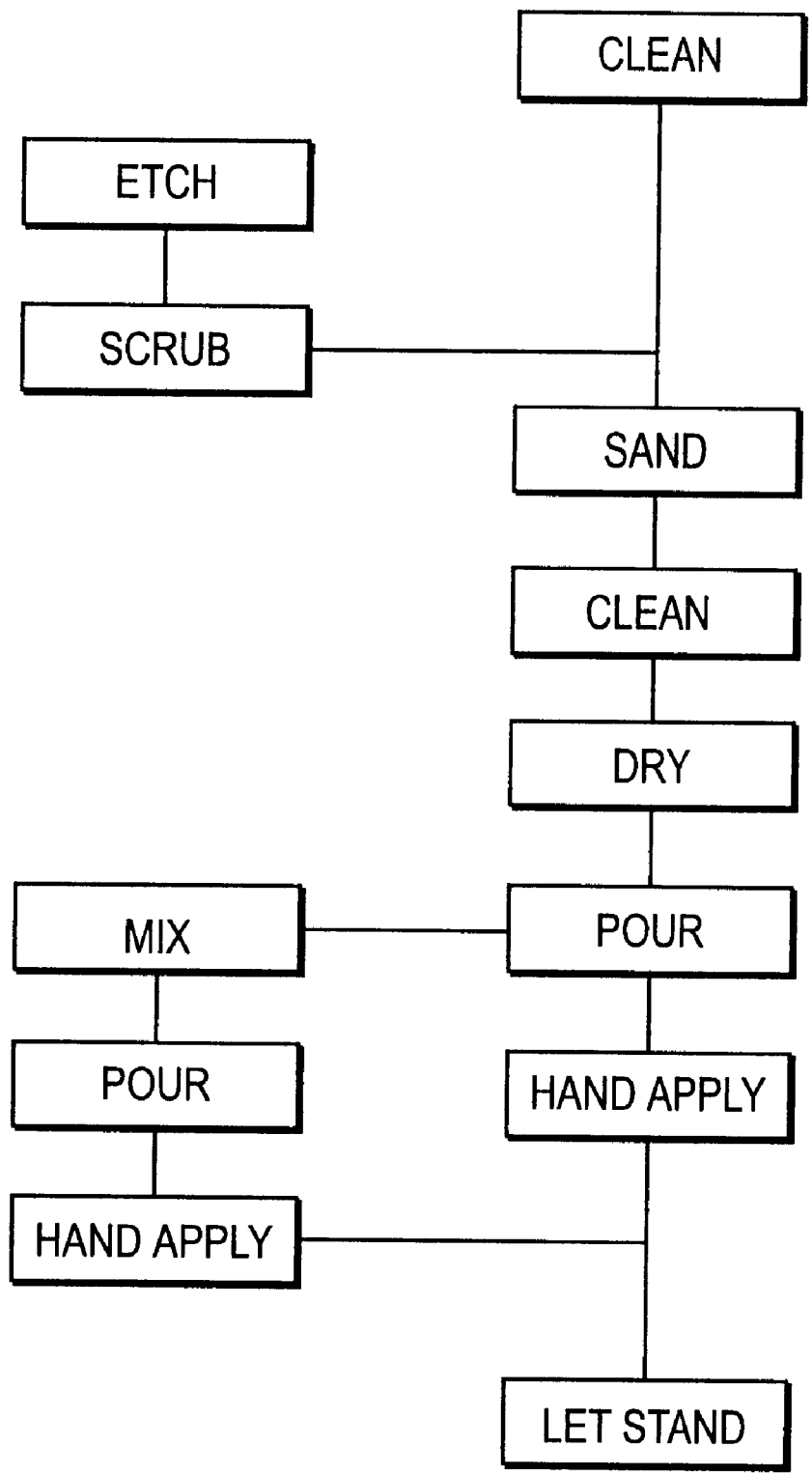
FIG. 1 is a flow diagram illustrating the principal steps in the method of the present invention.

In one preferred embodiment of the present invention, a hand spreadable urethane surface coating product is provided. The product is particularly useful for restoring the inside surfaces of a fixture or sanitary ware for washing, i.e., such washing fixtures or appliances as bathtubs, shower enclosures, basins, lavatories and wash tubs. The fixtures may have an existing surface of ceramic-like material, usually formed by a porcelain enamel coating on cast iron or steel, or by slip casting, or fiberglass, or other techniques known in the sanitary ware art, to which the product of the present invention can be applied.

The hand spreadable urethane surface coating product of the present invention is comprised of two non-aqueous liquid compositions. The first composition comprises at least one aliphatic acrylic urethane resin prepolymer. The prepolymer preferably is maintained in a pourable liquid state by the presence in the composition a diluent or solvent. Preferred diluents or solvents are acetates, ketones, or hydrocarbons, and mixtures thereof.

A particularly preferred acetate for this purpose is n-butyl acetate, a particularly preferred ketone is methyl n-amyl ketone and a particularly preferred hydrocarbon is xylene. Another acetate, which may be present in an amount of approximately 10 percent by weight of n-amyl acetate when present, is n-propyl acetate. Similarly, a lesser amount of methyl isobutyl ketone may be included when methyl n-amyl ketone is present, in a ratio by weight of approximately 100 parts of the latter to 2 parts of the former.

The first liquid composition is available as Product 3505C184 aliphatic acrylic urethane liquid composition provided by the North American Polymer Company, Ltd., 4426 N. Ravenswood Avenue, Chicago, Ill. 60640.

The second composition comprises a cross-linking agent for the urethane resin prepolymer. The preferred crosslinking agent is an isocyanate having more than two functional groups. The second composition further preferably comprises at least one acetate selected from the group consisting of propyl 2-methoxypropanol (PM) acetate, n-buytl acetate, ethyl acetate and mixtures thereof, and a fluoroaliphatic polymeric ester. The second composition preferably further includes a solvent or diluent compatible with the crosslinking agent. The preferred solvent or diluent for this purpose is a mixture of glycol ether acetate and a ketone, in a proportion of from equal parts to a ratio of 30% of one ingredient to 100% of the other ingredient. Most preferably the preferred solvent or diluent is present in a ratio of twice as much solvent or diluent by weight to the other ingredients in the composition.

The second liquid composition is available as Product3505C194 Urethane Crosslinker also provided by the North American Polymer Company Ltd.

The resultant product, upon the mixing of the first and second liquid compositions and applying the product in accordance with the method described herein provides a substantially smooth, even and durable surface to the pre-existing surface of the fixture, with the scratches and/or cracks in the pre-existing surface filled, with the new surface being aesthetically pleasing.

The preferred embodiments of the method of the present invention are generally schematically illustrated in FIG. 1, which will be referenced herein. The method generally comprises first cleaning the surface to be restored, i.e. covered, as illustrated in the box designated as CLEAN. The cleaning step generally preferably may include scrubbing the surface to remove dirt, residue and oils, and a commercially available industrial strength cleaning composition, available in most supermarkets and plumbing supply stores is recommended for this step.

If the fixture to be restored is of cast iron or steel, and the surface remains stained after the cleaning step, the surface should then be etched, as illustrated in the box designated as ETCH, with an acid, such as muriatic acid, also available in most supermarkets and plumbing supply stores. The acid etch should not be applied if the fixture surface is of fiberglass, or plastic, or if the surface has been previously resurfaced. Where the etch has been applied, the acid is to be removed after 5 to 10 minutes, preferably by rinsing or flushing with water. Following etching and rinsing or flushing, the surface is scrubbed, as designated in the drawing by the box designated SCRUB, preferably with a tub scrubber.

If etching of the fixture surface is required, following scrubbing, the surface is gently wet sanded, as illustrated by the box designated SAND, for example using wet/dry abrasive paper, having a grit in the range of from about 220 grit to about 600 grit; while if etching is not required, then the surface is also gently wet sanded, as also illustrated by the box designated SAND, for example using 220 grit wet/dry abrasive paper.

The surface following sanding, is next cleaned, as illustrated by the box designated CLEAN to remove any residue remaining after the scrubbing or the sanding, followed by thorough drying, illustrated by the box designated DRY, by either permitting the surface to dry in ambient air, or by applying heat, such as with a hair dryer or a heat lamp. The surface to be restored must be completely dry, with particular attention being addressed to drains about which moisture frequently accumulates.

As illustrated by the box designated MIX, the first and second liquid compositions, which form the product of the present invention, are combined and mixed thoroughly. Following mixing, a portion, for example approximately one-half of the combined and mixed portion is poured onto the surface to be covered, preferably first onto the inside bottom surface of the fixture. The mixture poured onto the surface is next hand "worked" or applied and spread across the bottom surface and up the walls and across any deck of the fixture, as illustrated in FIG. 1 by the box designated HAND APPLY. It is preferable to use a lint-free cloth to "work" the mixture in a generally circular pattern. Light strokes are recommended, as increased pressure may result in a brush-like look in the dried coating.

If necessary, and as needed, additional mixed portions of the combined first and second compositions can be poured onto the surface to be treated and applied, as noted above, and these steps repeated until the surface of the fixture to be treated is covered. The treated surface appears wet and glossy.

Following the hand application of the product as described above, the fixture is allowed to remain unused, as illustrated by the box LET STAND, for a period of at least 24 hours. Generally, the final drying or curing of the product will occur within about 24 hours under normal humidity and temperature conditions, with a longer period being required under increased humidity and/or increased temperature conditions.

EXAMPLE

A bathtub having its inside bottom, top and deck surfaces formed of porcelain enamel coating over cast iron was hand cleaned using an industrial strength cleaner. These surfaces were gently wet sanded using 600 grit wet/dry sand paper. Following sanding, the surfaces were cleaned, all loose residue from the sanding removed, and the surface thoroughly dried, with attention particularly paid to the drain area. In a container, four ounces of liquid aliphatic acrylic urethane composition, Product 3505 C184 obtained from the North American Polymer Company, Ltd., whose address is noted above, was combined with two ounces of isocyanate crosslinking agent composition therefor, Product 3505 C194, also obtained from the North American Polymer Company, Ltd. The combined compositions were thoroughly mixed, and one half of the mixed compositions was poured onto the bottom surface of the tub. A lint-free cloth was used to hand spread, i.e., "work" the poured material onto the bottom surface and up the sides and across the deck or top surface of the tub using a circular pattern. Light strokes were used, as it was found that heavier pressure or strokes resulted in brush-like finish to the dried coating. Additional portions of the remainder of the mixed compositions were poured onto the surface as needed and hand-applied with lint-free cloth until the entire surface of the bathtub was covered. After the hand application was complete, the surface appeared wet and very glossy. The tub was allowed to stand without use for 24 hours, after which the restored, i.e., covered surface had a like-new gloss appearance, and had a substantially stain resistant, durable surface.

Following the method of the present invention, the treated surface of the fixture will have a substantially smooth, even finish, with a gloss and apearance resembling the appearance of the fixture when it was new. In addition, the surface will have increased stain resistance and the life of the fixture is likely to be extended for a number of years.

While particular embodiments of the product and method of the invention have been shown and described, it will be appreciated by those skilled in the art that changes and modifications may be made thereto without departing from the invention in its broader aspects and as set forth in the following claims.

What is claimed is:

1. A method of covering an existing surface and filling surface imperfections therein to form a substantially smooth surface thereon, composed of:
   (a) cleaning the existing surface and removing any loose materials thereon;
   (b) allowing the existing surface to dry;
   (c) preparing a flowable surface coating mixture by combining:
      a first non-aqueous liquid composition of at least one aliphatic acrylic urethane resin, and
      a second non-aqeuous liquid composition of a crosslinking catalyst for said resin;
   (d) mixing said mixture; and
   (e) applying said mixture to the surface to be covered.

2. The method of claim 1, wherein at least one of said first and second liquid compositions of said mixture includes a solvent compatible with said ingredients therein.

3. The method of claim 2, wherein the solvent is a mixture of glycol ether acetate and a ketone.

4. The method of claim 1, wherein the said second liquid composition further comprises a fluoroaliphatic polymeric ester.

5. The method of claim 1, wherein the first liquid composition of at least one aliphatic acrylic urethane resin comprises isocyanate prepolymer and an alkyl acetate selected from the group consisting of n-butyl acetate, n-propyl acetate, and mixtures thereof, and a methyl ketone selected from the group consisting of methyl n-amyl ketone, methyl isobutyl ketone, and mixtures thereof.

6. The method of claim 1, wherein the second liquid composition of the crosslinking catalyst for said resin comprises at least one acetate selected from the group consisting of propyl 2-methoxypropanol acetate, n-butyl acetate, ethyl acetate, and mixtures thereof.

7. The method of claim 1, wherein the step of applying the flowable surface coating mixture to the surface comprises pouring a portion of the mixture on the surface and gently spreading the mixture substantially evenly across the surface, and repeating the applying step until the surface to be covered is substantially evenly covered with the mixture.

8. A method of covering an existing surface of a bathtub having surface imperfections therein and filling the surface imperfections therein to form a substantially smooth surface thereon, composed of:
   (a) cleaning the existing surface and removing any loose materials thereon;
   (b) allowing the existing surface to dry;
   (c) preparing a flowable surface coating mixture by combining:
      a first non-aqueous liquid composition of at least one aliphatic acrylic urethane resin, and
      a second aqueous liquid composition of a crosslinking catalyst for said resin;
   (d) mixing said mixture;
   (e) applying said mixture to the surface to be covered by: (i) pouring a portion of the mixture on the inside bottom surface of the bathtub, (ii) gently spreading and rubbing the portion of the mixture with a substantially lint-free cloth material substantially evenly across the inside bottom surface of the bathtub, (iii) repeating the pouring, spreading and rubbing with another portion of mixture to the inside sides of the bathtub and the deck of the bathtub until the surface to be covered is substantially evenly and substantially smoothly covered with the mixture, and (iv) allowing the applied mixture on the surface to dry.

9. The method of claim 8, wherein at least one of said first and second liquid compositions of said mixture includes a solvent compatible with said the ingredients therein, said solvent comprises a mixture of gloycol ether acetate and a ketone.

10. The method of claim 8, wherein the said second liquid composition further comprises a fluoroaliphatic polymer ester.

11. The method of claim 8, wherein the first liquid composition of at least one aliphatic acrylic urethane resin comprises isocyanate prepolymer and an alkyl acetate selected from the group consisting of n-butyl acetate, n-propyl acetate, and mixtures thereof, and a methyl ketone selected from the group consisting of methyl n-amyl ketone, methyl isobutyl ketone, and mixtures thereof.

12. The method of claim 8, wherein the second liquid composition of the crosslinking catalyst for said resin comprises at least one acetate selected from the group consisting of propyl 2-methoxypropanol acetate, n-butyl acetate, ethyl acetate, and mixtures thereof.

13. A method of covering an existing surface of a fixture designed for washing having surface imperfections therein and filling the surface imperfections therein to form a substantially smooth surface thereon, composed of:
   (a) cleaning the existing surface and removing any loose materials thereon;
   (b) allowing the existing surface to dry;
   (c) preparing a flowable surface coating mixture by combining:
      a liquid composition of at least one aliphatic acrylic urethane resin, and
      a liquid composition of a crosslinking catalyst for said resin;
   (d) mixing said mixture;
   (e) applying said mixture to the surface to be covered by: (i) pouring a portion of the mixture on the inside bottom surface of the fixture, (ii) gently spreading and rubbing the portion of the mixture with a substantially lint-free cloth material substantially evenly across the inside bottom surface of the fixture, (iii) repeating the pouring, spreading and rubbing with another portion of mixture to the inside sides of the fixture until the surface to be covered is substantially evenly and substantially smoothly covered with the mixture, and (iv) allowing the applied mixture on the surface to dry.

* * * * *

UNITED STATES PATENT AND TRADEMARK OFFICE
CERTIFICATE OF CORRECTION

PATENT NO. : 6,319,546 B1  
DATED : November 20, 2001  
INVENTOR(S) : Coven

It is certified that error appears in the above-identified patent and that said Letters Patent is hereby corrected as shown below:

Column 1,  
Line 11, "2. Description of Related Art" should be located on Line 12.

Column 4,  
Line 66, "apearance" should be -- appearance --.

Column 6,  
Line 19, "gloycol" should be -- glycol --.  
Line 22, "polymer" should be -- polymeric --.

Signed and Sealed this

Twenty-fifth Day of February, 2003

JAMES E. ROGAN  
*Director of the United States Patent and Trademark Office*